(12) United States Patent
Aghssa et al.

(10) Patent No.: US 7,527,327 B2
(45) Date of Patent: May 5, 2009

(54) REAR VEHICLE SUBASSEMBLY HAVING A TOWING HITCH MEMBER

(75) Inventors: Peyman Aghssa, Ann Arbor, MI (US); John Michael McGuckin, Ann Arbor, MI (US); Ali Kanberoglu, White Lake, MI (US); Behrooz Shahidi, Novi, MI (US); Mohammad Ali, Troy, MI (US); Shekar Prabhakar Erasala, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 76 days.

(21) Appl. No.: 11/857,040

(22) Filed: Sep. 18, 2007

(65) Prior Publication Data
US 2009/0072586 A1    Mar. 19, 2009

(51) Int. Cl.
*B62D 25/08*    (2006.01)
(52) U.S. Cl. .............. 296/203.04; 296/204; 296/187.11
(58) Field of Classification Search ............ 296/203.04, 296/204, 187.11; 280/505
See application file for complete search history.

(56) References Cited

U.S. PATENT DOCUMENTS

| | | | |
|---|---|---|---|
| 6,053,566 A | 4/2000 | Aghssa et al. | |
| 6,312,028 B1 | 11/2001 | Wilkosz | |
| 6,709,036 B1 | 3/2004 | Evans | |
| 6,739,613 B2 | 5/2004 | Aquinto et al. | |
| 6,814,379 B2 | 11/2004 | Evans | |
| 6,820,924 B2 | 11/2004 | Caliskan et al. | |
| 6,830,287 B1 | 12/2004 | Aghssa et al. | |
| 6,896,303 B1 | 5/2005 | Mohr | |
| 6,988,753 B1 | 1/2006 | Omura et al. | |
| 7,469,959 B2* | 12/2008 | Egawa et al. | 296/203.04 |
| 2003/0071490 A1* | 4/2003 | Nishikawa et al. | 296/203.04 |
| 2005/0110240 A1 | 5/2005 | Dornbos | |
| 2006/0197300 A1* | 9/2006 | Nakashima et al. | 280/124.109 |

* cited by examiner

*Primary Examiner*—Dennis H Pedder
(74) *Attorney, Agent, or Firm*—Gregory Brown; Brooks Kushman P.C.

(57) ABSTRACT

The invention discloses a uni-body frame subassembly for a motor vehicle having a towing hitch member. The uni-body frame subassembly involves a configuration for neutralizing the effect of a rear impact involving the rear bumper and the towing hitch member. More specifically, the subassembly comprises reinforcements for supporting and controlling the frame rail segments in a crash event. Controlling the collapse of the uni-body frame subassembly helps to dissipate energy from the impact and as a result delivers less energy to a vehicle occupant compartment.

20 Claims, 3 Drawing Sheets

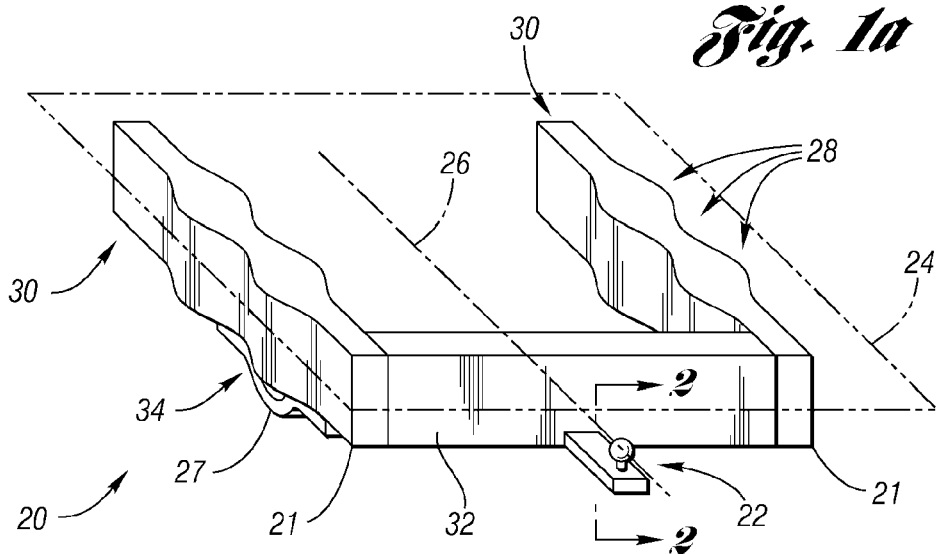
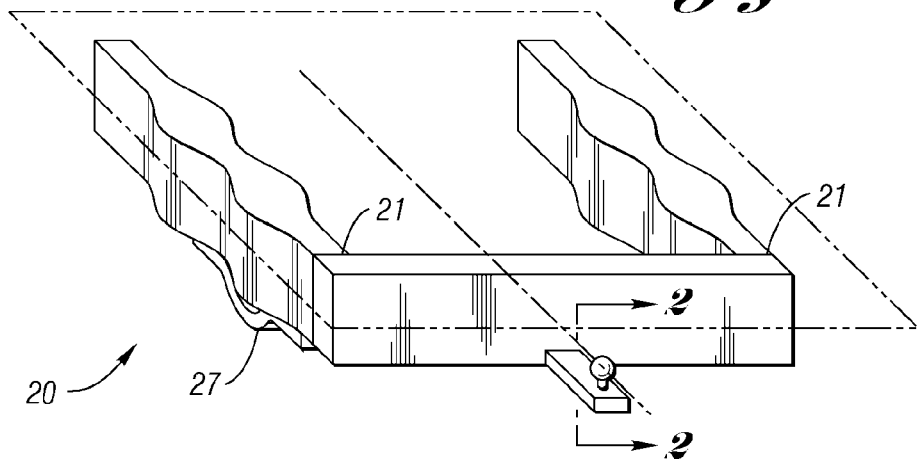
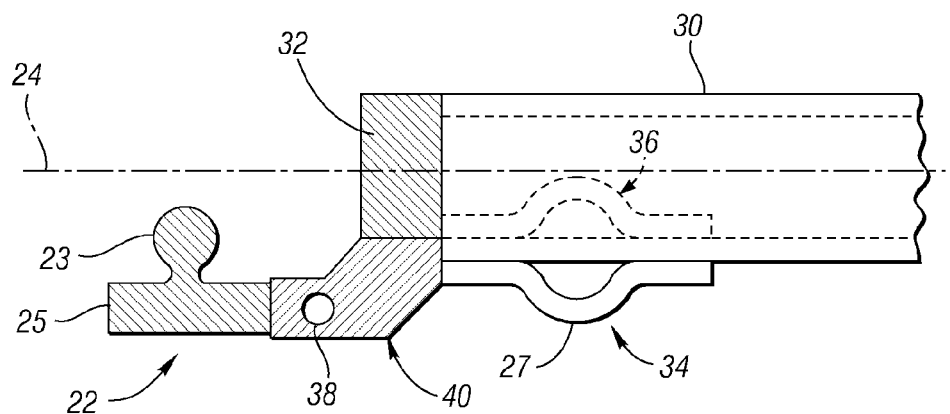

REAR VEHICLE SUBASSEMBLY HAVING A TOWING HITCH MEMBER

BACKGROUND OF THE INVENTION

1. Field of the Invention

The present invention relates generally to a uni-body frame subassembly for a motor vehicle having a towing hitch. More specifically, it relates to a configuration for neutralizing the effect of a rear impact involving the rear bumper and a towing hitch member.

2. Background Art

Conventional uni-body frame assemblies and subassemblies for motor vehicles having a towing hitch member have been evolving for quite some time. Many automotive manufacturers attach a towing hitch member to a transverse member or rear bumper beam. The towing hitch member commonly extends below the frame or underbody of the vehicle and additionally may be the rearmost component on the vehicle. The lowered position of this towing hitch member creates a moment arm and can become particularly disadvantageous in a rear crash event.

The automotive industry has recently implemented longitudinal rear frame rail subassemblies having a convoluted shape. In response to an impact, the convoluted shape ideally causes the longitudinal rear frame rails to axially collapse in a controlled manner. In comparison to a conventional collapse of rear frame rails without a convoluted shape, this type of collapse absorbs a greater portion of the energy originating from a crash impact.

A partial or direct impact on the towing hitch member and/or rear bumper member can lead to a considerable moment on the rear vehicle subassembly. This moment commonly causes the rear bumper to aggressively rotate into the rear frame rails. This in turn causes the rear frame rails to fold abruptly in a localized spot and transmit a significant force to vehicle occupants. This motion eliminates the functionality of the convoluted shape in the frame rails, and thus the convoluted shape does not dissipate energy as intended.

The deficiency with most existing rear vehicle assemblies and subassemblies having the towing hitch member regards counteracting this moment caused by the placement of the towing hitch member in combination with a rear impact. While these vehicles may or may not include features for dissipating energy along the length of the vehicle, absorbing this moment is critical to the safety of vehicle occupants. Ideally, a rear vehicle subassembly would include features to absorb this moment in addition to facilitating an axially controlled collapse wherein energy is absorbed along the length of the vehicle.

Consider U.S. Pat. No. 6,814,379 to Shape Corporation which has an elaborate egg crate design intended to absorb energy upon impact. This rear vehicle subassembly, in addition to associated manufacturing costs, does not properly address or intend to counteract the moment which can occur upon an impact to a lowered towing hitch member. U.S. Pat. No. 6,896,303 to Mohr includes energy absorbing features directly within and around the towing hitch member. While these features may absorb energy along the length of the vehicle, they neglect to counteract the moment which occurs upon an impact to a lowered towing hitch member.

Another complication in the automotive industry involves providing uni-body constructed vehicles with adequate towing capacity. Without a frame spanning the length of the vehicle, many uni-bodies lack the strength and reinforcement needed to achieve credible towing capabilities.

Accordingly, there is an inherent need for a rear vehicle subassembly which overcomes the deficiencies in rear vehicle assemblies and subassemblies involving a towing hitch member.

SUMMARY OF THE INVENTION

In light of the exemplary shortcomings explained with rear vehicle assemblies and subassemblies on the market, the present invention provides a solution for absorbing crash energy along the length of the vehicle in addition to controlling and counteracting the moment caused by an impact on the towing hitch member. In addition to controlling crush of a rear vehicle subassembly during an impact, the present invention increases towing capacity.

The present invention generally includes a pair of spaced apart longitudinal rail segments, a rear bumper beam or fender extending between the pair of spaced apart longitudinal rail segments, a towing hitch member mounted to the rear bumper beam, a pair of external reinforcements attached to the underside of the pair of spaced apart longitudinal rail segments, and a pair of internal reinforcements attached to an opposing surface of the pair of spaced apart longitudinal rail segments. The present invention is intended for a broad spectrum of vehicles with a towing hitch member; thus details such as how the rear bumper beam connects to the pair of spaced apart longitudinal rail segments or how low the towing hitch member is placed are insignificant.

The pair of spaced apart longitudinal rail segments preferably have a convoluted shape to help facilitate an axially controlled collapse during a rear crash event. This convoluted shape, as previously mentioned, allows the rails to absorb a portion of the impact. This is optimal because rails without a convoluted shape are likely to transmit more energy to the occupant compartment of the vehicle.

The pair of external reinforcements along the underside of the longitudinal rail segments are placed in a location for absorbing a rotating rear bumper beam. Again, a moment created by a rear impact and the placement of the towing hitch member causes the bumper beam to rotate inboard. The pair of external reinforcements are substantially U-shaped for absorbing the rear bumper beam. This U-shape serves a dual purpose in that it additionally causes the rear bumper beam to collapse and work in harmony with the convolute along the pair of spaced apart longitudinal rail segments. It may be helpful to think of this controlled collapse being similar to the motion seen in an accordion instrument.

The pair of internal reinforcements are very similar to the external reinforcements in that they also have a U-shaped structure, are located directly above the external reinforcements, and additionally help the rear vehicle subassembly to axially collapse in a controlled manner upon a rear crash impact. These internal reinforcements are placed within each longitudinal rail segment and are attached to the opposing surface from which the external reinforcements are attached. These reinforcements also supplement the rigidity of the longitudinal rail segments and support the vehicle during towing operations.

An additional object of the invention is to provide a rear vehicle subassembly that reduces damage to both colliding vehicles in a crash event. The additional absorption provided by the present invention will benefit the occupants of both vehicles involved in the crash.

Another object of the invention is to provide a simplistic, cost effective, and uni-body frame subassembly for a motor vehicle having a towing hitch member.

Another object of the invention is to provide a method for manufacturing a motor vehicle in a towing and non-towing configuration. These configurations and associated components are easily distinguishable yet do not add considerable complexity to the vehicle assembly process.

Other aspects, objects, and advantages of the disclosed invention will become apparent to one skilled in the art from a study of the following description and associated drawings.

BRIEF DESCRIPTION OF THE DRAWINGS

FIGS. 1A-1B show perspective views of two embodiments of the uni-body frame subassembly for a motor vehicle wherein the pair of external reinforcements and the towing hitch member extend below a generally horizontal plane. The rear bumper beam can extend between or along the ends of the pair of spaced apart longitudinal rail segments.

FIG. 2 shows a cross-sectional view of one embodiment of the uni-body frame subassembly for a motor vehicle.

DETAILED DESCRIPTION OF THE PREFERRED EMBODIMENT(S)

Figure 3:
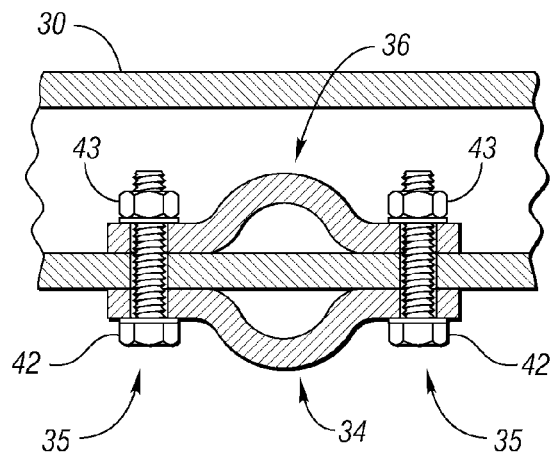
FIG. 3 shows a side view of one of the pair of external reinforcements attached via fasteners to one of the pair of spaced apart longitudinal rail segments.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to utilize the present invention.

Referring to FIGS. 1A-1B, a rear vehicle subassembly 20 can be provided by attaching a rear bumper beam 32 between a pair of spaced apart longitudinal rail segments 30 or to ends 21 of the pair of spaced apart longitudinal rail segments 30. The pair of spaced apart longitudinal rail segments 30 and the rear bumper beam 32 may be positioned at relatively the same height and should be considered to be extending along a generally horizontal plane 24. The pair of spaced apart longitudinal rail segments 30 feature a convoluted shape 28 and are equidistant from a vehicle centerline 26. The pair of spaced apart longitudinal rail segments 30 are shown schematically although may very well include flanges (not shown) for attachment to a vehicle floor pan (not shown). The convoluted shape 28 provides increased ductility and reduced strength in localized regions. These properties, when strategically arranged, allow the pair of spaced apart longitudinal rail segments 30 to collapse in an axial direction and in a controlled manner. This axial direction is generally parallel to the vehicle centerline 26. The controlled manner helps to absorb a higher percentage of the impact energy commonly originating from a crash event.

The rear vehicle subassembly 20 includes a towing hitch member 22 extending below the generally horizontal plane 24. This towing hitch member 22, attached to the rear bumper beam 32, is placed adjacent to the vehicle centerline 26 and is commonly the rearmost component on a vehicle. A pair of external reinforcements 34 are attached to the pair of spaced apart longitudinal rail segments 30 and are positioned below the generally horizontal plane 24. The pair of external reinforcements 34 are U-shaped and provide a longitudinally deformable central region 27 for absorbing impact. The pair of external reinforcements 34 are attached to the pair of spaced apart longitudinal rail segments 30 at two longitudinally spaced apart locations, as better seen in FIG. 3. The pair of external reinforcements 34 are located adjacent to and inboard, or forward, of the rear bumper beam 32. The rear vehicle subassembly 20 may also include a pair of internal reinforcements 36 better seen in FIG. 2. The pair of internal reinforcements 36 are attached to an opposing surface 37 from which the pair of external reinforcements 34 are attached.

As previously mentioned, FIG. 2 better depicts the placement of the pair of internal reinforcements 36. The pair of internal reinforcements 36 are similar in shape and purpose to that of the pair of external reinforcements 34. FIG. 2 also shows a cross-sectional view of the rear vehicle subassembly 20 wherein the towing hitch member 22 further comprises hitch components including a receiver hitch 40 and a trailer ball 23 joined to a ball mount 25. The trailer ball 23 mates with the coupler (not shown) on a trailer (not shown) while the receiver hitch 40 houses the ball mount 25. A slot 38 commonly extrudes through both the ball mount 25 and the receiver hitch 40 for aligning and pinning the ball mount 25 within the receiver hitch 40. Many times, even if the trailer ball 23 and ball mount 25 are not connected to the receiver hitch 40, the receiver hitch 40 is the rearmost component on a vehicle and is capable of creating the undesirable moment discussed above. It should be additionally noted that the towing hitch member 22 is not limited to a trailer ball 23 type hitch. For the intents and purposes of this invention, the towing hitch member 22 will generally refer to any type and combination of hitch components.

FIG. 3 shows an exemplary embodiment in which one of the pair of external reinforcements 34 are attached with fasteners 42 to one of the pair of spaced apart longitudinal rail segments 30 at two spaced apart locations 35. Weld nuts 43 may be a convenient fastening element especially if the pair of spaced apart longitudinal rail segments 30 are closed or have obstructed access. The pair of external reinforcements 34 may alternatively be attached via welding or other means. The pair of internal reinforcements 36 may also be attached to the pair of spaced apart longitudinal rail segments 30 via a number of methods. To reiterate, welding the pair of internal reinforcements 36 may be optimal if the pair of spaced apart longitudinal rail segments 30 do not permit sufficient accessibility.

Figure 4:
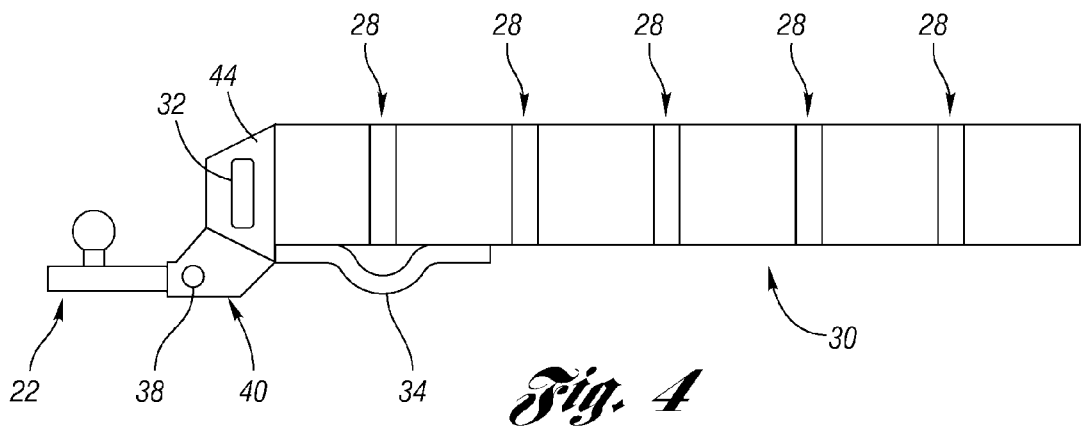
FIG. 4 shows a side view of one embodiment of the uni-body frame subassembly for a motor vehicle wherein a mounting flange attaches the rear bumper beam to the pair of spaced apart longitudinal rail segments. The mounting flanges are also attached to the pair of external reinforcements.

In another embodiment, the rear bumper beam 32 may be attached to the pair of spaced apart longitudinal rail segments 30 with a pair of mounting flanges 44 as shown in FIG. 4. The pair of external reinforcements 34 may also be directly attached to the mounting flanges 44. This would permit the mounting flanges 44 to engage the pair of external reinforcements 34 during a rear crash event in which the rear bumper beam 32 and towing hitch member 22 begin to rotate downward and inboard. The side view in FIG. 4 also shows the convoluted shape 28 along the pair of spaced apart longitudinal rail segments 30.

Figure 5:
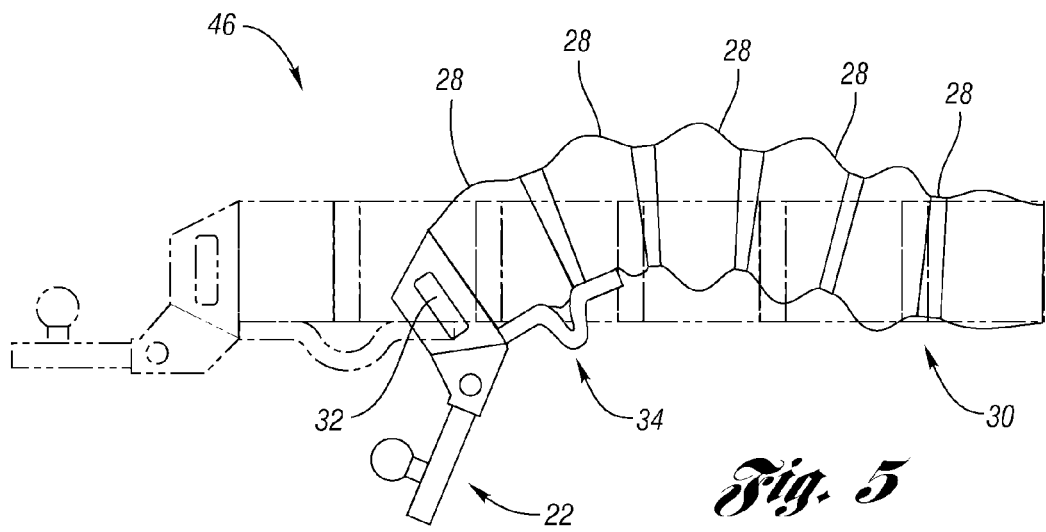
FIG. 5 shows a side view of a collapsed rear vehicle subassembly wherein the pair of internal and external reinforcements facilitate a controlled axial collapse upon a rear impact.

FIG. 5 shows how the rear vehicle subassembly 20 collapses in the event of a rear crash impact. When the towing hitch member 22 and/or the rear bumper beam 32 are struck, the towing hitch member 22 and the rear bumper beam 32 tend to rotate downwards and inboard due to the lowered positioning and rearwardly protruding orientation of the towing hitch member 22. The pair of external reinforcements 34 and the pair of internal reinforcements 36 are engaged and begin absorbing the rotating rear bumper beam 32. The convoluted shape 28 causes the pair of spaced apart longitudinal rail segments 30 to axially collapse while absorbing energy from the rear crash impact. It is both the pair of external reinforcements 34 and the pair of internal reinforcements 36 which counteract this disadvantageous moment and allow the convoluted shape 28 to properly function. More specifically, the longitudinally deformable central region 27 and the U-shape structure of the pair of external reinforcements 34 and the pair of internal reinforcements 36 collapse synchronously with the pair of spaced apart longitudinal rail segments 30 to facilitate this harmonized and controlled axial collapse.

When the towing hitch member 22 is not installed in the receiver hitch 40, the towing hitch member 22 may not be the rearmost vehicle component. A colliding object may impact the rear bumper beam 32 and subsequently contact the receiver hitch 40 which will also trigger the disadvantageous bending moment. The convoluted shape 28, the pair of external reinforcements 34, and the pair of internal reinforcements 36 will function as characterized above.

Figure 6:
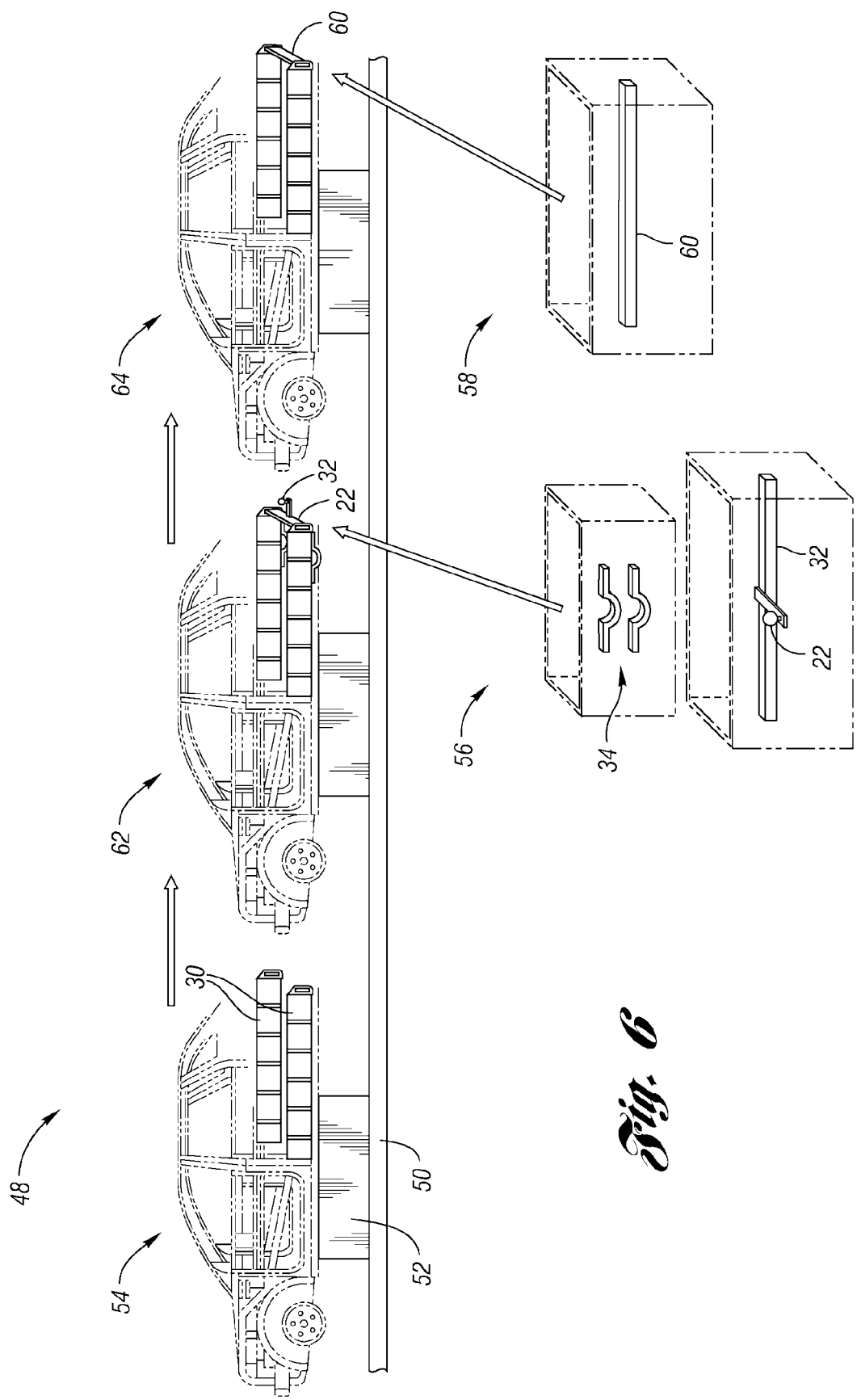
FIG. 6 shows a side view of an assembly line process wherein vehicles are easily equipped with a towing or non-towing configuration.

FIG. 6 shows an assembly line process 48 wherein a uni-body frame subassembly 54 can be configured in a towing configuration 62 and a non-towing configuration 64. The uni-body frame subassembly 54 rests on a buck 52 and proceeds along a conveyor 50. The uni-body frame subassembly 54 may have the pair of spaced apart longitudinal rail segments 30 already intact. Additionally, the pair of internal reinforcements 36 are installed on every uni-body frame subassembly 54. One of two packages is installed: the towing package 56 which comprises a pair of external reinforcements 34 and a rear bumper beam 32 having a towing hitch member 22, or a non-towing package 58 comprising an alternative rear bumper beam 60. FIG. 6 shows the uni-body frame subassembly 54 having the pair of mounting flanges 44. A similar operation could occur without the pair of mounting flanges 44 as illustrated in FIGS. 1 & 2.

Another embodiment exists wherein the towing configuration 62 and the non-towing configuration 64 are assembled while the uni-body frame is being built. For instance, an automotive uni-body fabricator could employ this practical method before shipping uni-body frames to the automotive assembly plant.

While the best mode for carrying out the invention has been described in detail, those familiar with the art to which this invention relates will recognize various alternative designs and embodiments for practicing the invention as defined by the following claims.

What is claimed:

1. A uni-body frame subassembly for a motor vehicle provided with a towing hitch member, the frame subassembly comprising:
    a pair of spaced apart longitudinal rail segments positioned on opposite sides of a vehicle centerline and extending along a generally horizontal plane;
    a rear bumper beam joined to and transversely extending between the pair of spaced apart longitudinal rail segments;
    a towing hitch member mounted to the rear bumper beam adjacent to the vehicle centerline and extending below the generally horizontal plane; and
    a pair of external reinforcements extending below the horizontal plane, each attached to one of the spaced apart longitudinal rail segments at two longitudinally spaced apart locations, the external reinforcements placed adjacent to and forward of the rear bumper beam and having a longitudinally deformable central region;
    wherein the external reinforcements cooperate with the pair of spaced apart longitudinal rail segments to axially collapse in a controlled manner in response to a rear crash impact.

2. The frame subassembly of claim 1, wherein the pair of external reinforcements each comprise at least one substantially U-shaped bracket.

3. The frame subassembly of claim 1, wherein the pair of external reinforcements are each attached to one of the pair of spaced apart longitudinal rail segments with a plurality of fasteners.

4. The frame subassembly of claim 2, wherein the substantially U-shaped brackets deform synchronously with the adjacent longitudinal rail segment to facilitate a harmonized axial collapse.

5. The frame subassembly of claim 1, wherein the pair of spaced apart longitudinal rail segments are provided with mounting flanges for attachment to the rear bumper beam.

6. The frame subassembly of claim 5, wherein the mounting flanges are configured to engage the pair of external reinforcements.

7. The frame subassembly of claim 1, further comprising a pair of internal reinforcements each attached to opposing surfaces of the spaced apart longitudinal rail segments, wherein the internal reinforcements are opposite the external reinforcements and cooperate with the pair of spaced apart longitudinal rail segments to axially collapse in a controlled manner in response to a rear crash impact.

8. The frame subassembly of claim 1, wherein the pair of spaced apart longitudinal rail segments have convolutions.

9. A frame subassembly for a uni-body motor vehicle capable of being manufactured in a towing and non-towing configuration, the frame subassembly comprising:
    a pair of spaced apart longitudinal rail segments positioned on opposite sides of a vehicle centerline and extending along a generally horizontal plane;
    a rear bumper beam attached and transversely extending between the pair of spaced apart longitudinal rail segments;
    a towing hitch member mounted to the rear bumper beam adjacent to the vehicle centerline and extending below the generally horizontal plane; and
    a pair of reinforcements extending below the horizontal plane, each attached to one of the spaced apart longitudinal rail segments at two longitudinally spaced apart locations, the reinforcements placed adjacent to and forward of the rear bumper beam and having a longitudinally deformable arcuate central region; the reinforcements cooperating with the pair of spaced apart longitudinal rail segments to axially collapse in a controlled manner in response to a rear crash impact;
wherein the frame assembly can be alternatively constructed in a non-towing configuration in which the towing hitch member and the pair of reinforcements are omitted.

10. The frame subassembly of claim 9, wherein the pair of reinforcements each comprise at least one substantially U-shaped bracket.

11. The frame subassembly of claim 9, wherein the pair of reinforcements are each attached to one of the pair of spaced apart longitudinal rail segments with a plurality of fasteners.

12. The frame subassembly of claim 10, wherein the substantially U-shaped brackets deform synchronously with the adjacent longitudinal rail segment to facilitate a harmonized axial collapse.

13. The frame subassembly of claim 9, wherein the pair of spaced apart longitudinal rail segments are provided with mounting flanges for attachment to the rear bumper beam.

14. The frame subassembly of claim 13, wherein the mounting flanges are configured to engage the pair of reinforcements.

15. A method for equipping a frame subassembly of a uni-body motor vehicle with a towing hitch member, the method comprising:

forming a vehicle frame subassembly having a pair of spaced apart longitudinal rail segments on opposite sides of a vehicle centerline and extending along a generally horizontal plane;

joining a transversely extending rear bumper beam to the pair of spaced apart longitudinal rail segments;

mounting a towing hitch member to the transversely extending rear bumper beam, the towing hitch member adjacent to the vehicle centerline and extending below the generally horizontal plane; and attaching each of a pair of reinforcements extending below the horizontal plane to one of the spaced apart longitudinal rail segments at two longitudinally spaced apart locations, the reinforcements placed adjacent to and forward of the transversely extending rear bumper beam and having a longitudinally deformable central region; wherein the reinforcements cooperate with the pair of spaced apart longitudinal rail segments to axially collapse in a controlled manner in response to a rear crash impact.

16. The method of claim 15, wherein the pair of reinforcements each comprise at least one substantially U-shaped bracket.

17. The method of claim 15, wherein the attaching step is accomplished using a plurality of fasteners.

18. The method of claim 16, wherein the substantially U-shaped brackets deform synchronously with the adjacent longitudinal rail segment to facilitate a harmonized axial collapse.

19. The method of claim 15, wherein the pair of spaced apart longitudinal rail segments are provided with mounting flanges for attachment to the rear bumper beam.

20. The method of claim 19, wherein the mounting flanges are configured to engage the pair of reinforcements.

* * * * *